Jan. 29, 1963   E. T. YAEGER   3,075,555
SEMI-AUTOMATIC DIRECT SALTING WATER SOFTENER
Filed Nov. 17, 1958   4 Sheets-Sheet 1
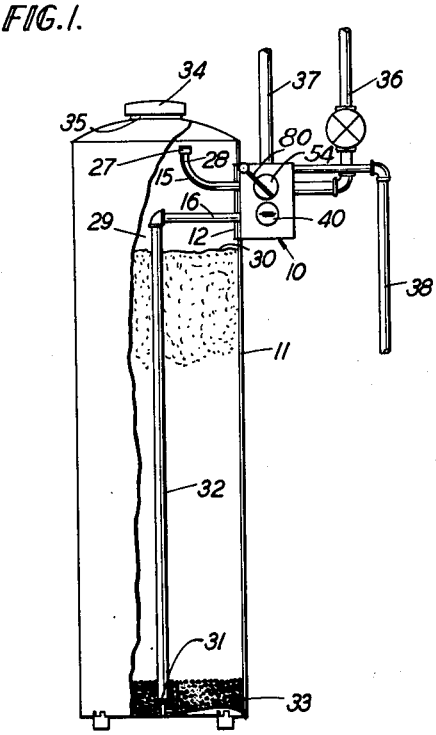
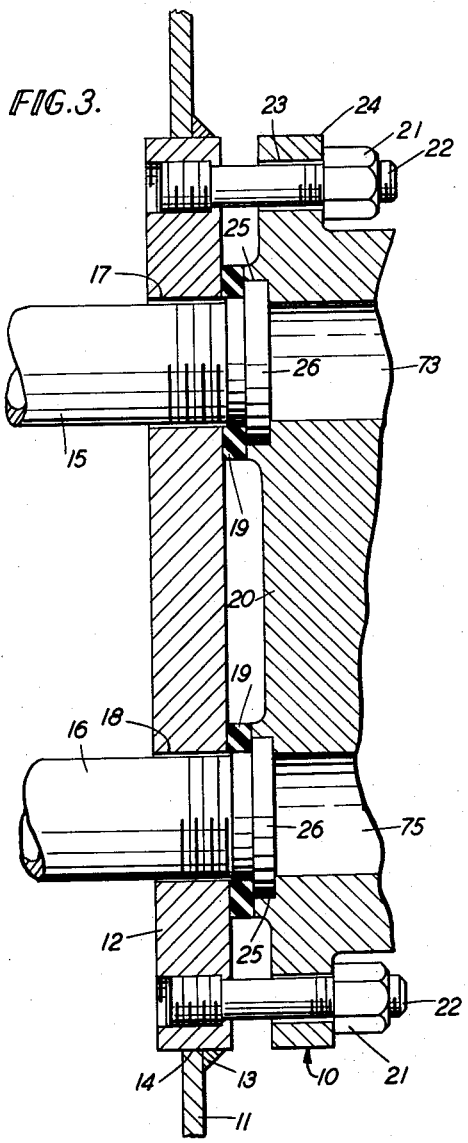
INVENTOR
EDWARD T. YAEGER
BY
Andrew F. Wintercorn
ATTORNEY Jan. 29, 1963 E. T. YAEGER 3,075,555
SEMI-AUTOMATIC DIRECT SALTING WATER SOFTENER
Filed Nov. 17, 1958 4 Sheets-Sheet 2
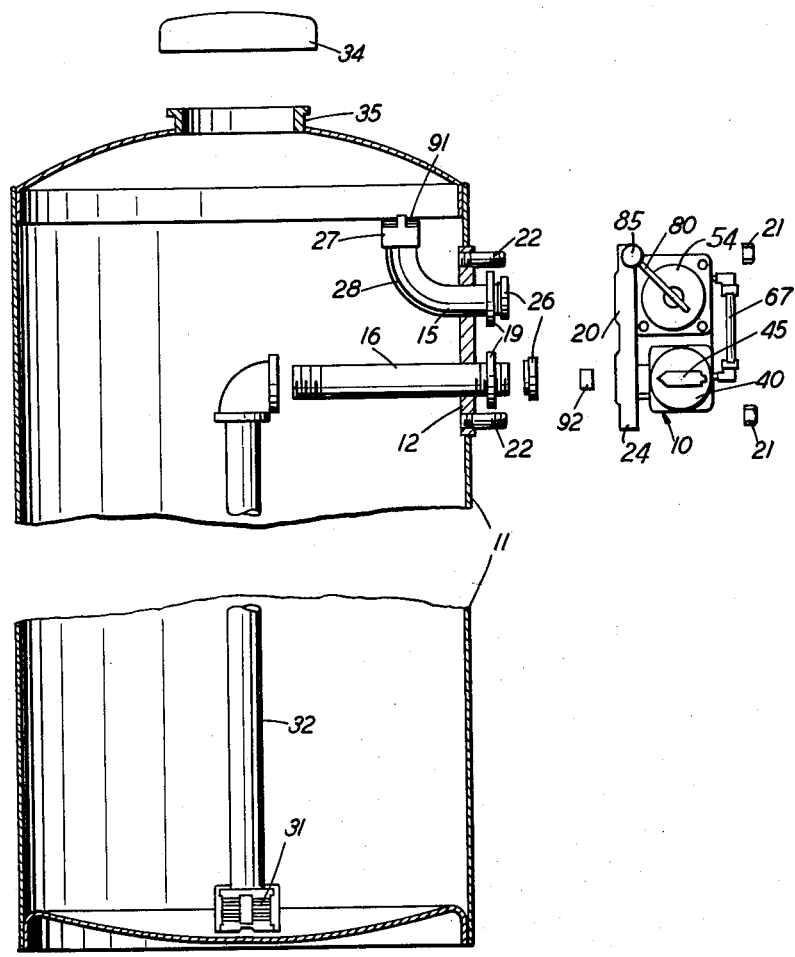
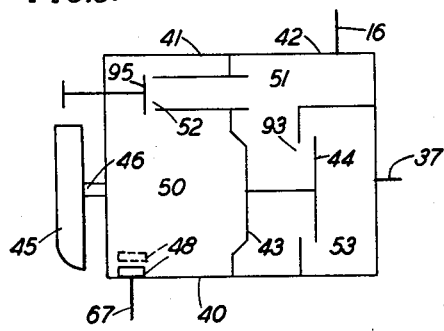
INVENTOR
EDWARD T. YAEGER
BY
ATTORNEY Jan. 29, 1963 E. T. YAEGER 3,075,555
SEMI-AUTOMATIC DIRECT SALTING WATER SOFTENER
Filed Nov. 17, 1958 4 Sheets-Sheet 3

INVENTOR
EDWARD T. YAEGER
BY
Andrew F. Wintercorn
ATTORNEY

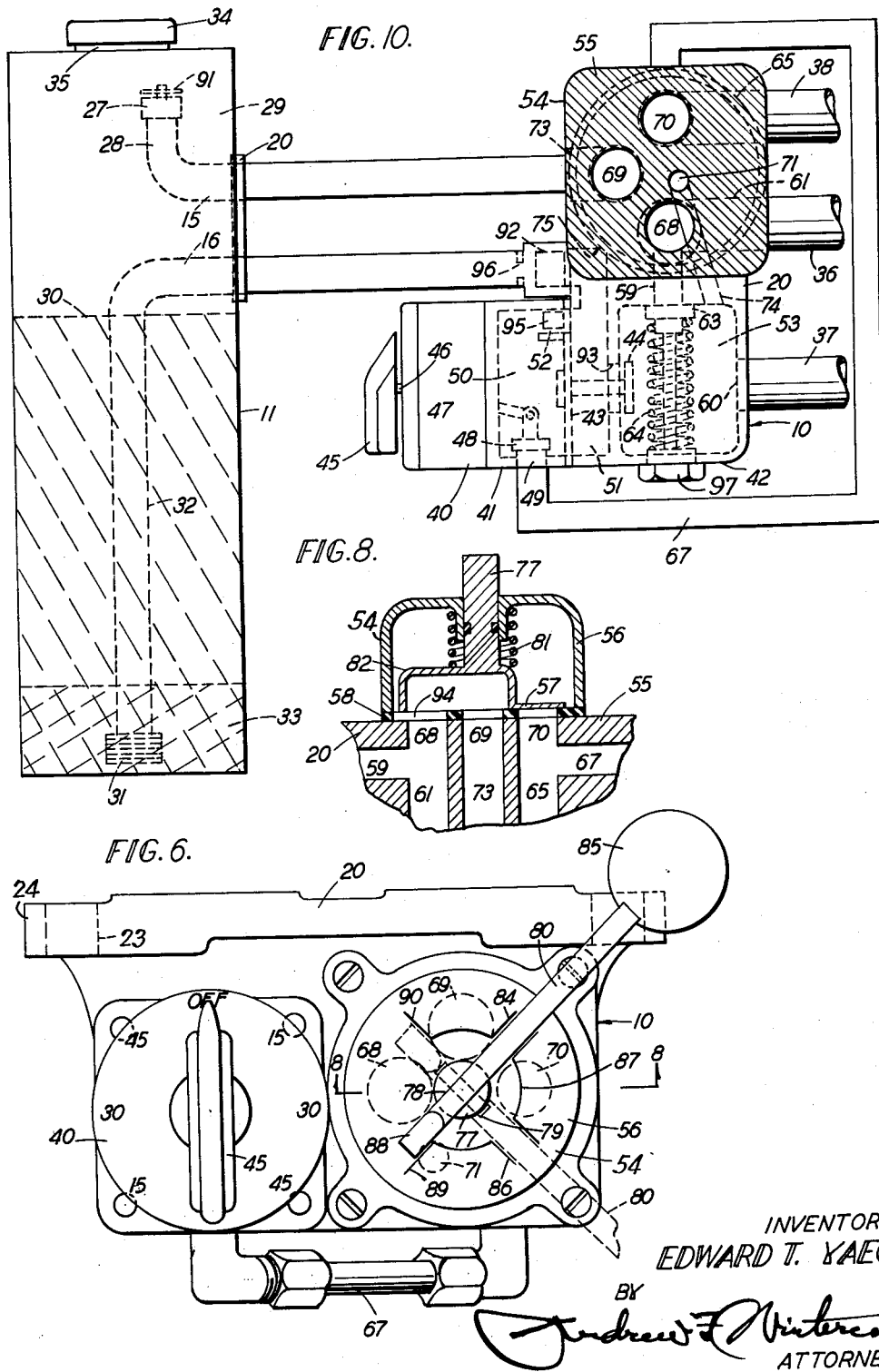

United States Patent Office 3,075,555
Patented Jan. 29, 1963

3,075,555
SEMI-AUTOMATIC DIRECT SALTING
WATER SOFTENER
Edward T. Yaeger, Elgin, Ill., assignor to Elgin Softener
Corporation, Elgin, Ill., a corporation of Illinois
Filed Nov. 17, 1958, Ser. No. 774,457
11 Claims. (Cl. 137—624.11)

This invention relates to water softeners and is more particularly concerned with a semi-automatic direct salting type water softener.

The present softener was designed with a special view to compactness and therefore, except for the raw water supply pipe, service pipe and drain pipe connections, has all other piping internally, thus making it possible to install the unit in a space not much larger than the size of the softener tank itself, for example, a space approximately ten inches square, this being made possible by the novel clamping of the valve mechanism onto a plate welded in place in the side wall of the tank, compressing gasket rings between the plate and valve body, the gasket rings encircling the protruding end portions of the internal pipes and being compressed against rings provided on the protruding end portions of the pipes and received in locating recesses provided in the valve body.

The desired compactness of the present softener makes internal salting necessary because there is no room for a brine tank alongside the softener, and, of course, the elimination of the brine tank makes it possible to offer this internal salting softener at a low price attractive to builders of low priced homes. The novel control valve and timer combination provided in accordance with my invention reduces the regeneration operation virtually to its simplest terms and eliminates any likelihood of confusion, so that even a mechanically unskilled person will have no difficulty attending to the regeneration.

The multiport valve, due to the novel combination with an automatic timer, requires only two positions— service and backwash— and the the shifting of the valve and the setting of the timer are the only operations the user has to take care of, outside of pouring in the right amount of salt at the time of each regeneration.

The invention is illustrated in the accompanying drawings, in which—

FIG. 1 is a vertical section through a water softener embodying my invention, showing the front of the valve mechanism;

FIG. 2 is an exploded larger scale view showing the components of FIG. 1 in disassembled relationship;

FIG. 3 is a section on a still larger scale through the joint between the valve body and mounting plate, illustrating the sealed connections for the outer ends of the two internal pipes;

FIGS. 4, 5 and 6 are views of the valve and timer assembly; FIG. 5 showing only the base therefor;

FIG. 8 is a sectional detail through the valve on line 8—8 of FIG. 6;

FIG. 9 is a diagrammatic illustration of the timer to supplement the showing thereof in FIG. 10, and FIG. 10 is an operating diagram.

The same reference numerals are applied to corresponding parts throughout the views.

Figure 4:
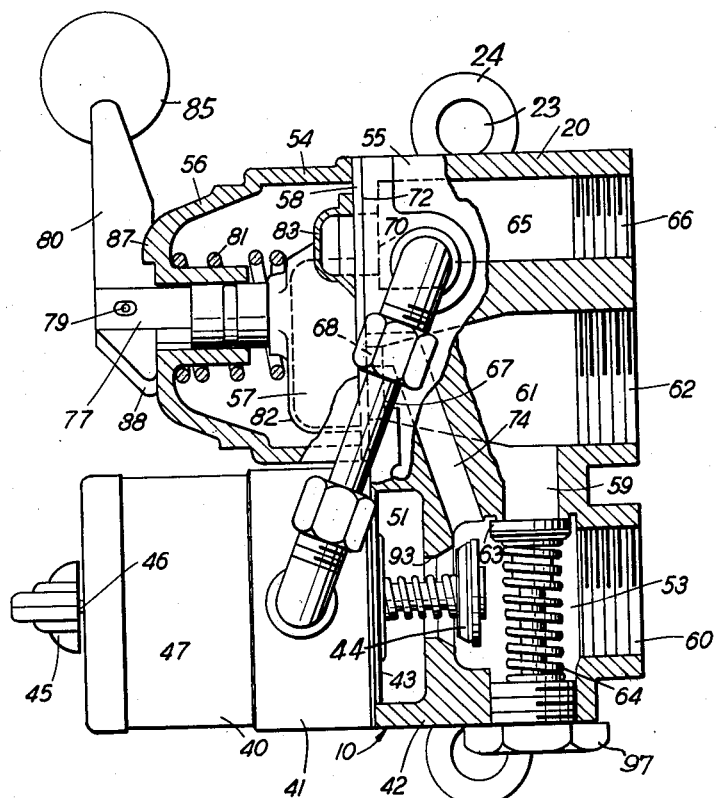

Referring to FIG. 1, the reference numeral 10 designates the novel multiport valve and timer assembly which, in accordance with my invention, is mounted directly on the side of the softener tank 11 on a mounting plate 12 suitably welded, as indicated at 13 in FIG. 3, to the wall of the tank where the plate is set in an opening 14 provided therefor, two pipes 15 and 16 provided inside the tank and extending through openings 17 and 18 provided therefor in the plate 12 being connected with the valve and timer unit 10 and sealed in water-tight relationship to both the tank and the unit 10 by compression of gasket rings 19 between the plate 12 and the base portion 20 of the unit 10 when nuts 21 threaded on studs 22 entered through holes 23 in the ears 24 on the bore 20 are tightened. Locating recesses 25 are provided in the base 20 of unit 10 to receive metallic rings 26 threaded on the ends of the pipes 15 and 16, and hence, as the gasket rings 19 which surround the protruding ends of the pipes are compressed between the plate 12 and base 20, the joints are nicely sealed against water leakage, and the pipes are at the same time secured rigidly in the correct relationship to the tank, with the openable, closeable strainer head 27 on the extremity of the upwardly bent inner end portion 28 on pipe 15 near the top of the freeboard space 29 in the tank above the bed 30 of zeolite or other water softening material, and with the stainer 31 that is provided on the lower end of a pipe 32 connected by means of an elbow to the inner end of the pipe 16 disposed at or near the bottom of the tank substantially centrally with respect to the gravel bed 33 usually provided. The removable cap 34 is suitably secured with a water-tight connection on the neck 35 provided on the upper end of the tank, as by means of the usual screw clamp, not shown. The softener with the unit 10 mounted thereon in the manner described takes up an absolute minimum amount of space, very litle more than the diameter of the tank itself and hence, this softener can be installed where others of conventional design and even smaller capacity would not fit because of the space consumed by external pipe connections. The only external pipe connections required in the installation of this softener are the raw water supply pipe 36, the soft water service pipe 37, and drainage pipe 38.

Referring to FIGS. 2, 4, 6, 9 and 10, the timer 40 comprises a two-piece valve body 41—42, the base portion 42 of which forms an integral portion of the base 20 of the unit 10. Between the pieces 41 and 42 a rubber diaphragm 43 is clamped by its marginal edge portion, and this is operatively connected centrally thereof with the stem of a poppet valve 44. So long as the manual set knob 45 on the outer end of a stem 46 that extends into the timer housing 47 is in the "Off" position, a pilot valve 48, which may be of any suitable type but is shown in FIG. 10 as a flap valve, remains seated to close off pressure relief passage 49 to maintain a predetermined pressure in chamber 50, the latter having restricted communication with chamber 51, as indicated at 52 in FIG. 9, so that the pressure responsive diaphragm 43 holds the valve 44 open, allowing free flow from chamber 51 into chamber 53. However, the instant the knob 45 is turned from the "Off" position and set for a given time, during which the valve 44 is to remain closed, pilot valve 48, which is operated by a clock mechanism in the timer housing 47, is opened, as indicated in dotted lines in FIG. 9, and remains open for the set time, and, due to the pressure differential between chambers 50 and 51, the diaphragm 43 reverses its position and closes valve 44. Knob 45 is shown in FIG. 6 in the "Off" position, but the graduations indicate to where the knob must be turned in a clockwise direction in setting the timer for a given number of minutes, up to 60, to keep valve 44 closed for a predetermined time within that range, as hereinafter described.

Figure 5:
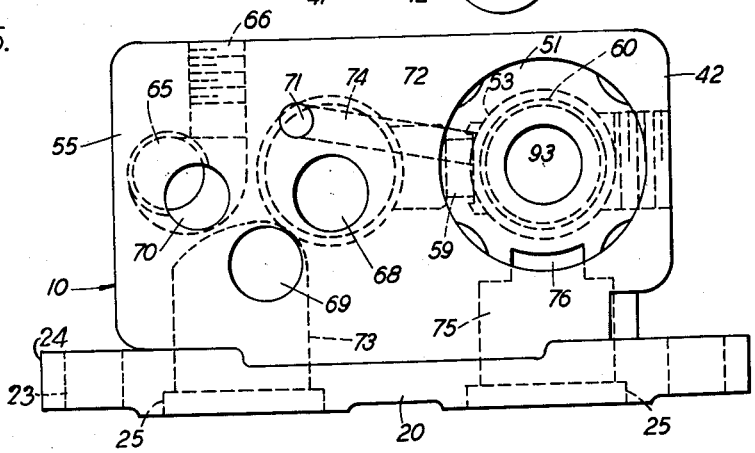
Figure 7:
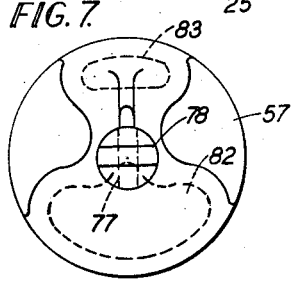
FIG. 7 is a plan view of the stem plate.

The multi-port valve 54 forming the rest of unit 10 comprises a main body or base portion 55, a bonnet or cover portion 56, and a stem plate 57, that is adapted to be raised off the gasket 58, clamped between the parts 55 and 56, and turned and lowered again onto the gasket, whereby to shift the valve from a "service" position to a "backwash" position, or vice versa, these being its only two positions, as previously indicated. The base portion 55 of the valve 54 forms an integral portion of the base 20 of the unit 10, as clearly appears in FIGS. 4 and 5, and this base 20 includes a connecting passage 59 between the chamber 53, with which the service pipe 37 is connected at 60, and the chamber 61, with which the raw water supply pipe 36 is connected at 62, so that during regeneration of the softener raw water may be bypassed to the service system past the check valve 63 that is normally held closed by means of a coiled compression spring 64. The chamber 65 in the base 20, with which the drain pipe 38 is connected at 66, has one end of a pipe connection 67 communicating with it, the other end communicating with the chamber 50 in the upper part 41, of the two-piece timer valve body 41—42, and the timer operated pilot valve 48 controls this connection. There are four ports 68–71 provided in the flat face 72 of the base 20 with which ports provided in the gasket 58 register, the port 68 communicating with the raw water inlet chamber 61, port 70 with the drain chamber 65, port 69 with a chamber 73 with which the internal pipe 15 communicates, and port 71 communicating with a passage 74 leading to the soft water outlet chamber 53. A chamber 75, with which the internal pipe 16 communicates, communicates with the chamber 51 through a cored passage 76.

The stem plate 57, the stem 77 of which is slotted diametrically of its outer end, as shown at 78, for pivotal connection, as at 79, with a hand lever 80, is normally held seated under pressure of a coiled compression spring 81, and has two hollow bosses 82 and 83 provided thereon, the larger one 82 of which in the "service" position of the valve interconnects the ports 68 and 69 for delivery of raw water from the pipe 36 through pipe 15 into the top of the softener for downflow softening, the smaller boss 83 in that position being out of communication with the other two ports 70 and 71. That is the position in which the lever 80 appears in FIG. 6, locked against accidental displacement from said position by engagement in a notch 84 on the top of the bonnet 56. The lever 80 can be raised by an upward pull on the handle 85 to unseat the stem plate 57 against the resistance of the spring 81 and turned through 90° to the "backwash" position, where the lever engages in another notch 86, 90° removed from notch 84, the lever sliding on the arcuate raised portion 87 provided on top of the bonnet 56 as the lever is moved from the one position to the other, and dropping down into the notch 86 under recoil action of the spring 81 as the stem plate 57 is seated under the pressure of said spring when it reaches the "backwash" position, this position of the lever 80 being indicated in dotted lines in FIG. 6. There is no danger of an operator turning the stem beyond either of the two positions mentioned, because the fulcrum end portion 88 of the lever 80 is limited by engagement with a radial shoulder 89 in the "service" position, and in the "backwash" position by engagement with another radial shoulder 90 provided on top of the bonnet 56. Dole valves are diagrammatically indicated at 92 and 94 since such valves are well known in the art of flow control, are disclosed in U.S. Patents No. 2,389,134 and No. 2,454,929, and consist generally of an apertured plug which, when seated, allows restricted, pre-determined flow through the aperture and which, when unseated, allows unrestricted flow passed the aperture.

In operation, referring mainly to FIGS. 6, 8 and 10, and assuming that the lever 80 is in the full line "service" position of FIG. 6, raw water is delivered through pipe 36 to port 68 and through boss 82 in the stem plate 57 to port 69, and thence through the internal pipe 15 into the upper portion 29 of the softener tank 11 for flow downwardly through bed 30, the disc 91 which functions as a flow controlling check valve to allow free flow only in an inward direction, but only restricted flow in the opposite direction, being unseated fully by the incoming raw water. The raw water flows downwardly through the bed of zeolite or other ion exchange material 30 and supporting gravel bed 33 and out through the strainer or distributor 31 provided on the lower end of the vertical pipe 32. The soft water or treated water is conducted through the internal pipe 16 back to the valve base 20, bypassing the freely floating backwash flow controlling Dole valve 92 as the water flows into the chamber 51 in the base 20 and out through port 93 into the outlet chamber 53 (the valve 44 being open) and thence to the service system through pipe 37. There is no danger of the bypass check valve 63 allowing the raw water from pipe 36 to take a short cut directly to the service pipe 37, because the spring 64 maintains the necessary pressure differential. In other words, the pressure drop through the longer route from pipe 36 through the softener 11 to chamber 53 is less than the pressure of spring 64 on valve 63. When the stem plate 57 is in the "service" position it is held down under pressure of the spring 81 and also under hydraulic pressure by reason of the fact that the port 94 in the gasket 58 is enlarged sufficiently, as illustrated in FIG. 8, in relation to port 68 in the base 20 to provide communication between the raw water inlet port 68 and the inside of the bonnet 56. It is this additional hydraulic pressure on the stem plate that accounts for the drain port 70 being sealed tightly enough to prevent any leakage to the drain, and that, of course, is extremely important, considering the long period of time that the valve remains in the "service" position, and the large amount of water that could otherwise be wasted. Another possible alternate flow of water that is prevented is the flow of soft or treated water from the chamber 51 to chamber 50 through port 52 and through the rinse control valve 95, which is another Dole valve, and thence to the drain 38 through the pipe connection 67, such a flow being prevented by the closed pilot valve 48. The service flow described continues until the bed 30 requires regeneration.

To backwash the softener it is only necessary to shift the stem plate 57 from the "service" position shown in FIGS. 6 and 8 to the "backwash" position, in which the larger boss 82 on the stem plate interconnects the ports 69 and 70, and the smaller boss 83 interconnects ports 68 and 71, thereby:

(1) Connecting the top of the softener tank 11 through pipe 15 to atmospheric pressure through the drain pipe 38;

(2) Bypassing raw water to the service system during the brief period of back-wash from port 71 through passage 74 independently of the bypass check valve 63, and (3) Meanwhile maintaining the inside of the bonnet 56 under pressure through port 94 so that there is no undesired cross-flow between ports, such as might otherwise occur if the stem plate 57 relied solely upon the spring 81.

With the flow of water from the pressure port 68 limited to that small amount necessary to pressurize the interior of the bonnet 56, and with the interior of the tank 11 open to atmosphere, the pressure in the raw water supply pipe 36 is sufficient to overcome the resistance of the spring 64 and force the check valve 63 open to that raw water flows from the chamber 61 through passage 59 into chamber 53 and past the open valve 44 through port 93 into chamber 51 and out through pipe 16 into the bottom of the softener tank 11, forcing the backwash flow control valve 92 onto its seat 96 so that the backwash flow is through the Dole valve 92 instead of around it as before, and the flow is accordingly properly regulated and loss of zeolite or other ion exchange material to the drain is prevented, while still insuring the washing out of any collected suspended matter from the freeboard space 29. The disc check valve 91 during such outflow tends to close but is held open a predetermined amount, allowing only restricted flow, the restricted opening under the disc 91 being, however, large enough for the escape of the suspended matter from the freeboard space. The backwash flow is continued at the operator's option or convenience for a sufficient interval to insure washing out of impurities and loosening up of the bed 30 before the salting operation.

For the salting operation, the knob 45 on the timer 40 is turned in a clockwise direction from the "Off" position to the position representing the desired rinse time. This opens the pilot valve 48 (FIGS. 9–10) so that the chamber 50 is placed in communication with the drain pipe 38 through pipe connection 67, and is therefore at atmospheric pressure, whereupon, due to the pressure differential between chambers 51 and 50, the diaphragm 43 reverses its position, closing the valve 44. The pressure differential between chambers 51 and 50 tends to equalize thereafter but the pressure in the chamber 53 behind the valve 44 keeps it closed even when water is drawn from chamber 53 to the service system through pipe 37. The softener tank 11 is now isolated from the pressure in the raw water supply line 36, the stem plate 57 being still in the "backwash" position, and, hence, the cap 34 can be removed, allowing drainage of water from the tank 11 through pipe 15 to the drain down to the level of the check valve 91. This leaves room for an appropriate charge of salt which is poured in through the neck 35, whereupon the cap 34 is replaced and everything is in readiness for the rinse operation.

For the "rinse" operation, the stem-plate 57 is shifted back to the "service" position by means of lever 80. Raw water flowing through port 68 from line 36 passes through boss 82 as before during "softening" and passes through port 69 and pipe 15 into the top of the tank 11 to dissolve the salt and flow as brine downwardly through the bed 30 to regenerate the zeolite or other ion exchange material. The spent brine and released calcium leaving the bottom of the tank through the strainer 31 flows upwardly through pipe 32 and out through pipe 16 past the Dole backwash control valve 92 and through the Dole rinse control valve 95 and out to the drain 38 by way of pipe connection 67, the pilot valve 48 being held open by the timer 40 to permit flow via this route. The restriction to the flow to the drain during "rinse" insures the maintenance of a pressure differential between chambers 51 and 50, so that valve 44 will not be apt to open by reason of reversal of diaphragm 43, even when raw water is bypassed to the service system during the "rinse." It is only when the knob 45 on timer 40 returns to "Off" position at the end of the "rinse" operation that the valve 44 opens again and the softener is then back in service again. The timer 40 is set, of course, for a period long enough to insure complete rinsing of the bed. It should be noted that bypass passage 74 provides for constant communication between the service and raw water feed lines and prevents a complete shutdown of service during those periods of back-wash and rinse when valve 63 is closed.

In passing, attention is called to the plug 97 which can be removed easily to afford access to the bypass check valve 63 and its spring 64 in the event a change to a lighter or heavier spring is considered necessary for a given installation, considering the water pressure of the raw water source.

It is believed the foregoing description conveys a good understanding of the objects and advantages of my invention. The appended claims have been drawn to cover all legitimate modifications and adaptations.

I claim:

1. In a combination manually operable and time-controlled valve assembly, a single elongated valve body having one continuous flat top face and having in one end portion a pair of chambers with a connecting port therebetween, the one chamber opening to said top face, and through passages provided in the other end portion opening to said top face, a pressure responsive diaphragm engaging the aforesaid top face and closing the open end of said first named chamber and carrying a valve controlling flow through the connecting port between said chambers, a manually settable timer secured to the valve body clamping said diaphragm therebetween, said timer including a pressure chamber, said diaphragm being responsive to pressure in said pressure chamber and including a pressure relief valve which is normally closed to keep the diaphragm operated valve open but which is arranged to be held open for a predetermined interval timed by the timer when set, whereby to keep said diaphragm operated valve closed, a ported gasket also engaging the aforesaid top face and having ports therein communicating with the through passages, a ported two-position stem plate means engaging said gasket means and controlling fluid flow between said passages to provide one fluid circuit through said valve body in its normal position and another fluid circuit through said valve body in the other position, a bonnet enclosing said stem plate and secured to said body clamping said gasket therebetween, spring means in said bonnet holding said stem plate seated, and manually operable means connected with the stem of said stem plate for turning the same from its one operative position to the other, said stem plate being shiftable from its normal position to the other position for establishment of a selected fluid circuit through said valve body independently of the timer means control, and shiftable back to its normal position thereafter for establishment of another selected fluid circuit through said valve body subject to control by said timer means.

2. In a combination manually operable and time-controlled valve assembly, a single elongated valve body having one continuous flat top face and having in one end portion a pair of chambers with a connecting port therebetween, the one chamber opening to said top face, through passages provided in the other end portion opening to said top face, and a bypass passage connecting the other of the first mentioned chambers with one of said through passages, a spring-closed bypass valve controlling flow through said bypass passage, a pressure responsive diaphragm engaging the aforesaid top face and closing the open end of said first named chamber and carrying a valve controlling flow through the connecting port between said chambers, a manually settable timer secured to the valve body clamping said diaphragm therebetween, said timer including a pressure chamber, said diaphragm being responsive to pressure in said pressure chamber and including a pressure relief valve which is normally closed to keep the diaphragm operated valve open but which is arranged to be held open for a predetermined interval timed by the timer when set, whereby to keep said diaphragm operated valve closed, a ported gasket also engaging the aforesaid top face and having ports therein communicating with the through passages, a ported two-position stem plate engaging said gasket and controlling fluid flow between said passages to provide one fluid circuit through said valve body in its normal position and another fluid circuit through said valve body in the other position, a bonnet enclosing said stem plate and secured to said body clamping said gasket therebetween, spring means in said bonnet holding said stem plate seated, and manually operable means connected with the stem of said stem plate for turning the same from its one operative position to the other, said stem plate being shiftable from its normal position to the other position for establishment of a selected fluid circuit through said valve body independently of the timer means control, and shiftable back to its normal position thereafter for establishment of another selected fluid circuit through said valve body subject to control by said timer means.

3. An assembly as set forth in claim 1 wherein one of said through passages is a drain passage at atmospheric pressure, said assembly including a pipe connection between said pressure chamber in said timer and said drain passage the flow through which is controlled by said timer controlled pressure relief valve.

4. An assembly as set forth in claim 2 wherein one of said through passages is a drain passage at atmospheric pressure, said assembly including a pipe connection between said pressure chamber in said timer and said drain passage the flow through which is controlled by said timer controlled pressure relief valve.

5. An assembly as set forth in claim 1 wherein said body has two ports provided in another face, one of which ports communicates with one of said through passages, and the other of which ports communicates with the second mentioned chamber in the other end of said body.

6. An assembly as set forth in claim 2 wherein said body has two ports provided in another face, one of which ports communicates with one of said through passages, and the other of which ports communicates with the second mentioned chamber in the other end of said body.

7. An assembly as set forth in claim 1 including a passage provided in said body connecting the second mentioned chamber in one end portion and a port provided in the flat top face in the other end porftion and controlled by the stem plate.

8. An assembly as set forth in claim 2 including a passage provided in said body connecting the second mentioned chamber in one end portion and a port provided in the flat top face in the other end portion and controlled by the stem plate, whereby enabling fluid to flow to the second mentioned chamber independently of said spring-closed bypass valve.

9. In combination, a timer valve including a main chamber and a second chamber and a two-position valve therebetween which in normal position establishes communication between the main and second chambers and which in the other position closes off such communication, means for shifting the valve from the normal position to the other position in response to setting of a timer and returning the valve to normal position in response to return of the timer to its initial position, and a timer having a manually settable knob for selection of the length of time the valve is to remain in the other than normal position, and a manually operable two-position multi-port valve including a multiported body having a port connected with the main chamber interconnected with the timer valve, the latter being shiftable from normal position to the other position for alignment of one valve body port with the main chamber independently of the timer valve, which may be prolonged or shortened to suit the operator's convenience, said two-position valve being shiftable thereafter back to normal position for alignment of another valve body port with the main chamber subject to control by the timer valve after setting thereof for the timing of the continuance of the second established port alignment for a predetermined period of time.

10. A control valve assembly adapted for use with a liquid treating apparatus comprising a tank containing a bed of liquid conditioning material and having a removable closure on the top thereof permitting supplying reconditioning material to said bed, and conduit means connecting the opposite ends of said tank with a source of liquid, to drain, and to a point of use, said control valve assembly comprising a manually settable timer valve comprising a valve body with an inlet chamber, an outlet chamber, a pressure chamber, a valve controlling communication between the inlet and outlet chambers, means subject to pressure in the pressure chamber connected with the valve normally holding the valve open but closing the valve automatically upon relief of pressure in the pressure chamber, means providing restricted communication between the inlet chamber and pressure chamber, a manually set timer mechanism, and a pressure relief valve for the pressure chamber that is normally closed but is connected to be automatically opened by the timer mechanism when set from off position and automatically closed again when the timer mechanism returns to off position, said manually settable timer valve combined with a manually operable, two-position multi-port control valve connected with said timer valve to provide four flow circuits, namely, one for softening, another for backwash, another for draining water from and adding salt to the softener, and another for salt flow and rinsing, in the first two of which the timer valve is in a normal position, and in the latter two of which the timer valve is in its other than normal position, the manual valve being in one position for the first and last circuits and in its other position for the second and third circuits.

11. In combination, a timer valve including a two-position valve, means for shifting the valve from a normal position to another position in response to setting of a timer and returning the valve to normal position in response to return of the timer to its initial position, and a timer having a manually settable knob for selection of the length of time the valve is to remain in the other than normal position, and a multi-port, multi-position valve having certain of the ports thereof connected with the timer valve, so that the timer controls flow through the multi-port valve in at least one position thereof, the latter being shiftable from a normal position to another position for the performance of a function independently of the timer valve, which function may be prolonged or shortened to suit the operator's convenience, said multi-port valve being shiftable thereafter back to normal position for joint functioning with the timer valve after setting thereof for the timing of the joint function to continue a predetermined period of time.

References Cited in the file of this patent
UNITED STATES PATENTS

| | | |
|---|---|---|
| 2,513,178 | Jackson | June 27, 1950 |
| 2,571,000 | Albertson | Oct. 9, 1951 |
| 2,641,280 | Fleishhauer | June 9, 1953 |
| 2,665,709 | Harvey | Jan. 12, 1954 |
| 2,668,066 | Stadelhofer | Feb. 2, 1954 |
| 2,852,072 | Alfrey et al. | Sept. 16, 1958 |
| 2,905,325 | Johnson | Sept. 22, 1959 |
| 2,907,462 | Webb | Oct. 6, 1959 |